(12) United States Patent
Li et al.

(10) Patent No.: US 11,871,187 B2
(45) Date of Patent: *Jan. 9, 2024

(54) METHOD FOR CONFIGURING A HEARING-ASSISTANCE DEVICE WITH A HEARING PROFILE

(71) Applicant: Concha Inc., San Carlos, CA (US)

(72) Inventors: Amy Li, San Carlos, CA (US); Matthew Sorg, San Carlos, CA (US)

(73) Assignee: Concha Inc., San Carlos, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 17/687,293

(22) Filed: Mar. 4, 2022

(65) Prior Publication Data

US 2022/0191632 A1 Jun. 16, 2022

Related U.S. Application Data

(63) Continuation of application No. 16/893,297, filed on Jun. 4, 2020, now Pat. No. 11,304,016.

(60) Provisional application No. 62/857,214, filed on Jun. 4, 2019.

(51) Int. Cl.
*H04R 25/00* (2006.01)
*G06N 20/00* (2019.01)
*G06T 7/60* (2017.01)

(52) U.S. Cl.
CPC .......... *H04R 25/70* (2013.01); *G06N 20/00* (2019.01); *G06T 7/60* (2013.01); *H04R 25/505* (2013.01)

(58) Field of Classification Search
CPC .......... G06T 7/60; G06N 20/00; H04R 25/00
USPC ......... 381/23.1, 74, 312, 321, 367, 370, 376
See application file for complete search history.

(56) References Cited

U.S. PATENT DOCUMENTS

2013/0343585 A1* 12/2013 Bennett .................. H04W 4/80
381/317

FOREIGN PATENT DOCUMENTS

WO   WO 2015108717   *  7/2015   ............. G06F 19/00

* cited by examiner

*Primary Examiner* — Yosef K Laekemariam
(74) *Attorney, Agent, or Firm* — Run8 Patent Group, LLC; Peter Miller

(57) ABSTRACT

A method includes: generating a hearing profile for a user; accessing a set of hearing-assistance device options, each hearing-assistance device option defining a form factor of a hearing-assistance device, in a set of hearing-assistance devices; accessing an image of an ear of the user; detecting a set of constraining dimensions in the image of the ear of the user; identifying a subset of hearing-assistance device options, in the set of hearing-assistance device options, defining form factors conforming to the set of constraining dimensions; accessing a set of preferences of the user; ranking the subset of hearing-assistance device options based on the set of preferences; selecting a first hearing-assistance device option, from the subset of hearing-assistance device options, corresponding to a highest rank in the subset of hearing-assistance device options; and configuring a first hearing-assistance device represented by the first hearing-assistance device option with the hearing profile.

18 Claims, 3 Drawing Sheets

METHOD FOR CONFIGURING A HEARING-ASSISTANCE DEVICE WITH A HEARING PROFILE

CROSS-REFERENCE TO RELATED APPLICATIONS

This Application is a continuation of U.S. patent application Ser. No. 16/893,297, filed on 4 Jun. 2020, which claims the benefit of U.S. Provisional Application No. 62/857,214, filed on 4 Jun. 2019, both of which are incorporated in their entireties by this reference.

This Application is related to U.S. Pat. No. 10,595,135, filed on 15 Apr. 2019, which is incorporated in its entirety by this reference.

TECHNICAL FIELD

This invention relates generally to the field of sound augmentation devices and specifically to a new and useful method for configuring a hearing-assistance device in the field of sound augmentation devices.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. METHOD

Figure 1:
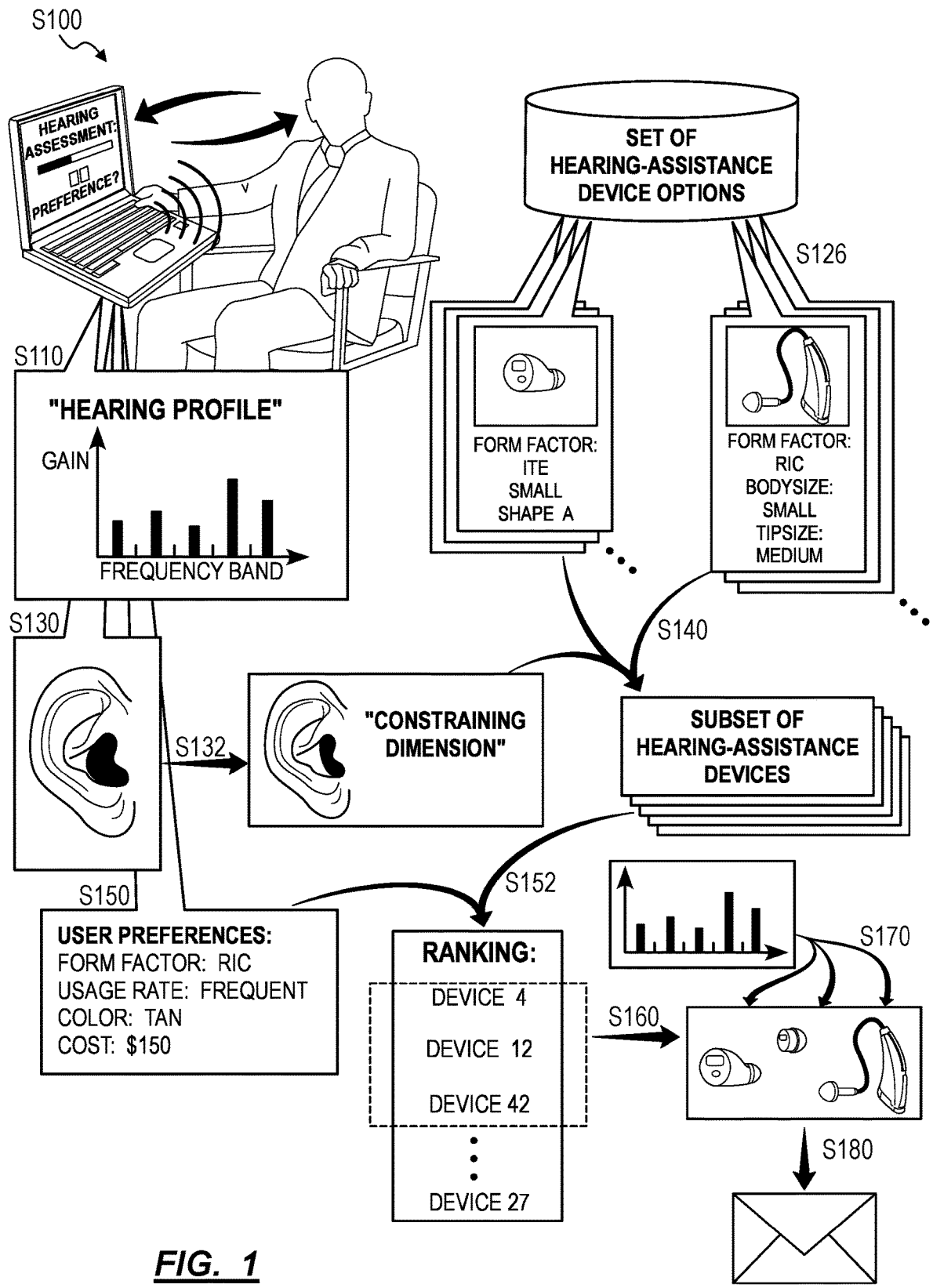
FIG. 1 is a flowchart representation of a method.

As shown in FIG. 1, a method S100 for configuring hearing-assistance devices includes: generating a hearing profile for the user based on a hearing assessment of the user in Block S110; accessing a set of hearing-assistance device options, each hearing-assistance device option defining a form factor of a hearing-assistance device, in a set of hearing-assistance devices in Block S120; accessing an image of an ear of the user in Block S130; detecting a set of constraining dimensions in the image of the ear of the user in Block S132; identifying a subset of hearing-assistance device options, in the set of hearing-assistance device options, defining form factors conforming to the set of constraining dimensions in Block S140; accessing a set of preferences of the user in Block S150; ranking the subset of hearing-assistance device options based on the set of preferences of the user in Block S152; selecting a first hearing-assistance device option, from the subset of hearing-assistance device options, corresponding to a highest rank in the subset of hearing-assistance device options in Block S160; and configuring a first hearing-assistance device represented by the first hearing-assistance device option with the hearing profile for the user in Block S170.

One variation of the method S100 includes: generating a hearing profile for the user based on a hearing assessment in Blocks S110; accessing a set of hearing-assistance device options, each hearing-assistance device option defining a form factor of the hearing-assistance device in Block S120; detecting a constraining dimension based on an image of the ear of the user in Block S132; identifying a first subset of hearing-assistance device options in the set of hearing-assistance device options defining form factors conforming to the constraining dimension in Block S140; accessing a set of preferences of the user in Block S150; identifying a second subset of hearing-assistance device options in the first subset of hearing-assistance device options most likely to be selected by the user based on the set of preferences of the user in Block S160; configuring a selected set of hearing-assistance devices represented in the second subset of hearing-assistance devices with the hearing profile for the user in Block S170; and dispatching the selected set of hearing-assistance devices to the user in Block S180.

Another variation of the method S100 includes: generating a hearing profile of a user based on a hearing assessment in Block S110; accessing a set of hearing-assistance device options, each hearing-assistance device option defining a full-on gain of the hearing-assistance device, defining a number of frequency bands of the hearing-assistance device, and defining a form factor of the hearing-assistance device in Block S120; accessing a set of constraining dimensions representing an ear of the user in Block S132; identifying the subset of hearing-assistance device options, in the set of hearing-assistance device options defining form factors conforming to the set of constraining dimension, defining full-on gains greater than the minimum full-on gain, and defining numbers of frequency channels greater than the minimum number of frequency channels in Block S140; accessing a set of preferences of the user in Block S150; ranking the subset of hearing-assistance device options based on the set of preferences of the user in Block S152; selecting a set of highest-ranked hearing-assistance device options from the subset of hearing-assistance device options, the set of highest-ranked hearing-assistance device options representing a set of highest-ranked hearing-assistance devices in Block S160; and configuring each hearing-assistance device in the set of highest-ranked hearing-assistance devices with the hearing profile of the user in Block S170.

2. APPLICATIONS

Generally, the method S100 is executed by a system (e.g., a mobile computing device executing an application, a computer system, and/or a distributed computer network): to generate a hearing profile of a user representing the hearing deficiency of the user (i.e. an inability to hear soft sounds, a sensitivity to loud sounds, or any other hearing challenge); to extract ear anatomy information from an image of the user's ear; to retrieve user preferences for hearing-assistance devices; and to select—from a catalogue of hearing-assistance device options—a set of hearing-assistance devices that satisfy the user's hearing needs, anatomical features, and preferences. The system can, therefore, isolate a subset of distinct hearing-assistance devices that span potential combinations of user priorities for hearing-assistance, comfort, aesthetics, battery life, full-on gain (hereinafter "FOG"), etc. A supplier packager or other entity affiliated with the system may then deliver (e.g., mail) the subset of devices to the user, and the user may select a device from the subset of devices that best aligns with her priorities—without input from an audiologist or an extensive fitting session for the hearing-assistance device.

Before selecting a set of hearing-assistance devices for the user, the system generates a hearing profile for the user by executing a hearing assessment, wherein the user expresses a preference (e.g., via an A/B testing protocol) for a particular gain within each frequency band (i.e. channels) of the human-audible sound range (e.g., 20 to 20,000 Hz). Thus, upon executing the hearing assessment, the system can represent the hearing profile of the user as an array, matrix, or discrete function that relates a specific gain (i.e. relative volume amplification) to each frequency band. The system can then evaluate each hearing-assistance device option in a catalogue of hearing-assistance device options to determine whether the hearing-assistance device can effectively differentially amplify and/or attenuate various frequency bands according to the hearing profile of the user. For example, if the FOG of a hearing-assistance device in a particular frequency band is less than a gain specified by the hearing profile of the user or if the hearing-assistance device does not offer a number of channels greater than that which is specified by the hearing profile of the user, then the hearing-assistance device cannot execute the hearing profile of the user and can be excluded as an option in the hearing-assistance device selection process.

The system can also obtain fitting information in order to select a hearing-assistance device that physically fits a user by prompting (via a mobile or browser application) the user to record an image of her ear. The system can then process the image of the user's ear (e.g., via. a computer vision pipeline) in order to obtain a set of constraining dimensions that correlate with form factors and/or specific sizes of hearing-assistance devices. For example, the system can detect or measure the distance between an end of the user's forward helix (e.g., where the forward helix intersects the side of the user's head) to the top of the user's ear canal as a constraining dimension for receiver-in-canal hearing aids (hereinafter "RIC hearing aids"). Additionally or alternatively, the system can detect the shape and or size of a user's concha cavum as a constraining dimension for in-the-ear hearing aids (hereinafter "ITE hearing aids"). Upon detecting various constraining dimensions for each form factor of the hearing-assistance devices represented in the set of hearing-assistance device options, the system can then filter the catalogue of hearing-assistance devices to remove hearing-assistance devices that are not likely to fit the user such as hearing-assistance devices of a particular form factor or characterized by a particular size.

Furthermore, the system can rank or score a filtered subset of the catalogue of hearing-assistance devices (i.e. filtered according to size/shape and sound processing capabilities) according to preferences expressed by the user. The system can prompt the user to complete a survey to provide user preferences such as a preferred form factor, color, price, weight, battery life or any other specification of a hearing-assistance device. The system can then rank (e.g., via a machine learning model) the hearing-assistance devices according to how likely they are to be selected by the user (and therefore satisfy their preferences at least when compared to other hearing-assistance devices offered to the user). The system can also incorporate user preferences expressed in return surveys or post engagement surveys to obtain additional details regarding a user's preference for hearing-assistance devices.

The system can also select a number of hearing-assistance device options based on the ranked subset of hearing-assistance device options and a set of selection criteria. The system can determine the set of selection criteria based on user preferences expressed via a survey. For example, if the user expresses that she would prefer hearing aids of only two form factors, the system can set selection criteria that exclude all hearing aids that are not characterized by the user's preferred form factors. Alternatively, the system can utilize selection criteria that are set by an administrator of the system in order to provide variety in hearing-assistance devices to improve the likelihood of user satisfaction. For example, the system can set selection criteria specifying a selection of the highest-ranked RIC and ITE hearing aids by the system.

Upon selecting a subset of hearing-assistance devices that satisfy the selection criteria and are likely to result in improved hearing-assistance, comfort, and general satisfaction of the user based on a ranking of hearing-assistance device options, the system can prompt an administrator or delivery service to deliver the selected subset of hearing-assistance devices to the user. When the user receives the selected hearing-assistance devices, the user can interface with the system via a mobile application in order to configure the hearing-assistance device with the user's hearing profile, thereby providing a well-fitting and user-preferable hearing-assistance device with a hearing profile calculated specifically for the user.

Additionally, the system can further refine the hearing profile of the user by performing an on-device hearing assessment with each of the hearing-assistance devices that are delivered to the user. Thus, the system can fine tune the hearing profile to account for the specific frequency response of each hearing-assistance device. The system can track revisions made to the user's hearing profile during each on-device hearing assessment to characterize and preemptively adjust a hearing profile for a particular device.

The system executes blocks of the method to select a set of "hearing-assistance devices" for a user, such as: hearing aids, wearable hearing-related devices ("hearable" devices), earphones/headphones in coordination with microphones, or any other devices capable of augmenting incoming sound.

3. EXAMPLES

In one example, a user can interface with the system to obtain a hearing assessment. The system can then generate a hearing profile for the user and prompt the user to order a hearing-assistance device based on the hearing assessment. The system can further prompt the user to record an image of the user's ear. Subsequently, the system can extract constraining dimensions of the user's ear from the image in order to size a hearing-assistance device for the user. Furthermore, the system can prompt the user to provide specific preferences pertaining to the hearing-assistance device, such as a preferred color or preferred form factor. Upon receiving the above information, the system can select a set of three hearing-assistance device options for delivery to the user that best fits the user's hearing needs, the user's ear size, and the user's expressed preferences, while also offering the user variety in the space of available hearing-assistance devices.

In one example, the system can select the highest-ranked RIC hearing aid, completely-in-canal hearing aid (hereinafter "CIC hearing aid"), and ITE hearing aid for the user. In another example, the system can select an RIC hearing aid with the best match for the user's hearing profile, an RIC hearing aid that best fits the user's ear, and an RIC hearing aid that matches the user's color preferences.

In each case, the system can then trigger a delivery of each of the selected hearing aids to the user and can configure each of the hearing-assistance devices with the hearing profile of the user.

4. HEARING ASSESSMENT

Generally, as described in U.S. Pat. No. 10,595,135, which is incorporated by reference in its entirety, the system can generate a hearing profile compensating for hearing deficiency of the user based on a hearing assessment in Block S110. More specifically, the system can generate a hearing profile that can be represented as a set (e.g., represented as an array) of gain values, wherein each gain value corresponds to a frequency band in a human-audible frequency range. In particular, the system can generate a baseline hearing profile approximately compensating for hearing deficiency of the user based on the user's demographic data and an initial hearing test; collecting hearing preferences from the user (e.g., in the form of volume adjustments) while playing a series of soundbites including spoken (e.g., vocal) phrases, each soundbite characterized by spectral peaks within particular frequency bands; and refining the baseline hearing profile to better reflect the user's hearing ability across the audible spectrum based on these hearing preferences. The system, in Block Silo, utilizes a combination of a microphone, a digital signal processor (e.g., within a personal, computer, laptop, smartphone), and a speaker (e.g., headphones, internal speakers of the signal processing device) to execute the hearing assessment.

The system can generate a baseline hearing profile that roughly (approximately) compensates for the hearing deficiency of the user according to an initial hearing assessment (e.g., a simplified audiogram) of the user and demographic data input by the user (e.g., age, sex, and/or occupation). For example, the system can render a set of data input fields within a user portal (e.g., a graphic user interface) in order to record demographic data associated with the user. Additionally, the system can render one or more slider bars (or any other adjustable user-interface element) with which the user may indicate the lowest audible volume of a testing tone (e.g., a 5 kHz tone) or the lowest volume at which the user can understand speech concentrated within a particular frequency band. The system can then estimate (e.g., via machine learning or other statistical techniques) a baseline hearing profile for the user.

After generating the baseline hearing profile for the user, the system can further refine the baseline hearing profile to generate a refined hearing profile for the user and to fully characterize the hearing deficiency of the user (e.g., in order to recommend particular hearing-assistance device). Thus, the hearing assessment can include playing a series of soundbites (e.g., sentences including phonemes having specific frequency characteristics) that are selectively output by the computing device, such as through headphones connected to or paired with the computing device. During this hearing assessment, the system can select a soundbite (i.e. a reproduceable audio signal) with a frequency spectrum predominantly within a particular frequency band. The system can then apply the baseline hearing profile to the soundbite and play the soundbite for the user. Subsequently, the system can play the soundbite a second time with altered gain within the particular frequency band (e.g., by altering the baseline hearing profile within the particular frequency band such as in an A/B testing procedure). After listening to the soundbite repeated according to the altered hearing profile within the frequency band, the user can then form a preference as to which of the soundbites was clearer or more easily perceived by the user.

The system can then request qualitative feedback from the user regarding how well the user has comprehended each version of the soundbite. If the system detects that the user has expressed a preference for the modified hearing profile, then the system can modify the hearing profile of the user accordingly, thereby providing an improved characterization of the user's hearing deficiency (e.g., as expressed by the hearing profile of the user).

The system can perform the above hearing assessment multiple times for the same frequency band (e.g., by playing a pair of soundbites with various gain values applied within the frequency band) in order to refine the user's hearing deficiency and preferred gain within that frequency band. Furthermore, the system can perform the hearing assessment across multiple frequency bands included in the hearing profile in order to precisely determine the user's hearing preferences.

The system can compile the user's feedback from the hearing assessment tests into a refined hearing profile that, when applied to an input audio signal, enhances (amplifies and/or reduces) select frequencies (at different input volumes) within the audible or vocal spectrum to compensate for the user's hearing deficiency, thereby enabling the user to better hear sound generally and to comprehend human speech more specifically. In particular, the system can generate and store the refined hearing profile executable by an audio device to amplify select frequencies and thus enable the user to better comprehend human speech given feedback collected from the user during a brief hearing assessment.

In one implementation, upon generating a hearing profile for a user, the system can, based on features of the hearing profile of the user, calculate a minimum number of frequency channels and/or a minimum FOG sufficient for a hearing-assistance device to execute the hearing profile of the user. For example, the system can generate a hearing profile for a user that includes ten unique gain values across the human-audible spectrum and, therefore, indicates that the minimum number of frequency channels sufficient for a hearing-assistance device to execute the hearing profile is equal to ten frequency channels. Likewise, the system can generate a hearing profile for a user that includes a maximum gain value of 50 decibels and, therefore, indicates that the minimum FOG sufficient for a hearing-assistance device to execute the hearing profile is equal to 50 dB.

However, the system can generate a hearing profile in any other way such as based on other types of hearing assessments including traditional audiogram tests (e.g., pure tone audiometry tests), speech discrimination tests, acoustic reflex tests, or via selection of a preset hearing profile.

5. HEARING-ASSISTANCE DEVICE OPTIONS

Generally, the system can access a set of hearing-assistance device options in Block S120. More specifically, the system can access a catalogue of hearing-assistance device options, wherein each hearing-assistance device option in the catalogue details the specific characteristics of the associated hearing-assistance device. The system can access hearing-assistance device options that include specifications for a particular model of hearing-assistance device as well as a number of variants of each hearing-assistance device model such as different sizes of the same model or available tip sizes for the same model. The system can access hearing-assistance device options that include specifications of the form factor of the hearing-assistance device and/or a constraining dimension of the hearing-assistance device for sizing, a size of the hearing-assistance device (corresponding to ranges of the constraining dimension), FOG of the hearing-assistance device, number of frequency bands (or channels) of the hearing-assistance device, the bandwidth and spectral positioning of the frequency bands of the hearing-assistance device, the color of the hearing-assistance device, and/or the battery life (or battery capacity) of the hearing-assistance device. However, each hearing-assistance device option can include any other specification of the represented hearing-assistance device.

The system can additionally access a hearing-assistance device catalogue that can include hearing-assistance device options representing invisible-in-canal hearing aids (hereinafter "IIC hearing aids"), completely-in-canal hearing aids (hereinafter "CIC hearing aids"), RIC hearings aids, ITE hearing aids, receiver-in-the-ear hearing aids (hereinafter "RITE hearing aids"), behind-the-ear hearing aids (hereinafter "BTE hearing aids), or any other form factor of a hearing-assistance device.

Each hearing-assistance device option in the catalogue of hearing-assistance device options defines a corresponding constraining dimension relative to human ear anatomy, which is predictive of the size of the hearing-assistance device that is appropriate for a user's ear characterized by a constraining dimension of a particular value. In one implementation, the system can access hearing-assistance device options for RIC hearing aids that define a constraining dimension equal to a distance between the end of a user's forward helix to the top of the user's ear canal (as shown in FIG. 2A). As a result, an appropriate size of an RIC hearing aid corresponds to the distance between the end of the user's forward helix and the top of the user's ear canal. Additionally or alternatively, a hearing aid option representing an ITE or RITE hearing aid can define a constraining dimension equal to the minimum distance between the edge of a user's concha and the user's external auditory meatus. In one implementation, the system can access hearing-assistance device options that define the length and/or shape of a two-dimensional edge defined relative to a user's ear anatomy. For example, a hearing-assistance device option can define an edge along a user's antihelix as a constraining dimension.

In one implementation, a hearing-assistance device option can define multiple constraining dimensions if more specific size options are available (e.g., if different sized silicone tips or specifically shaped chassis are available for the hearing-assistance device).

In another implementation, a hearing-assistance device option can define multiple types of tips, such as open tips or closed tips, each type corresponding to a hearing sensitivity of the user (e.g., as measured by the hearing assessment). For example, the system can select a closed tip (that reduces background noise) for users with high hearing sensitivity. Alternatively, the system can select an open tip for users with lower hearing sensitivity.

6. CAPABILITY FILTERING OF HEARING-ASSISTANCE DEVICE OPTIONS

Generally, the system can filter the set of hearing-assistance device options based on the capabilities of each hearing-assistance device represented by each hearing-assistance device option expressed in terms of the FOG of each hearing-assistance device and the number of frequency channels of each hearing-assistance device in order to eliminate hearing-assistance devices from the set of hearing-assistance device options that are not capable of executing the hearing profile of the user. More specifically, the system can: filter the set of hearing-assistance device options to remove hearing-assistance device options in the set of hearing-assistance device options defining a full-on gain less than the minimum full-on gain indicated by the hearing profile of the user and to remove hearing-assistance device options in the set of hearing-assistance device options defining a number of frequency channels less than the minimum number of frequency channels indicated by the hearing profile of the user. Thus, prior to ranking each of the hearing-assistance device options based on subjective user preference, the system eliminates options that are not capable of compensating for a user's hearing deficiency.

In one implementation, the system can also remove hearing-assistance device options from the set of hearing-assistance device options based on the boundary locations of frequency bands corresponding to each frequency channel of the hearing-assistance device represented by each hearing-assistance device option. For example, the system can: access a hearing profile of a user indicating a large variation between adjacent frequency bands; and remove hearing-assistance device options that include only a single frequency channel spanning the adjacent frequency bands of the hearing profile.

7. EAR SIZING IMAGE ACQUISITION

Generally, the system can access an image of an ear of the user in Block S130. More specifically, the system can prompt the user, via a mobile application, to record an image of one or both of the user's ears. The system can also provide further instructions to the user such as to include a size reference in the image and/or to record the image at a particular angle and/or distance relative to the user's ear.

In one implementation, the system can prompt the user to include a size reference when recording an image of the user's ear, wherein the size reference can include any standardized currency that can be associated with a consistence size.

In another implementation, the system can execute a computer vision model (further described below) that can evaluate the efficacy of the image recorded by the user in real time to determine whether locations of particular visual features of the ear can be detected from the recorded image, wherein the particular visual features are associated with the constraining dimensions corresponding to form factors of hearing-assistance devices in the catalogue of hearing-assistance devices.

In yet another implementation, the system can prompt the user to record a video (i.e., a set of images) of her ear while translating or rotating the camera such that the system can generate a three-dimensional model of the user's ear, as is further described below. In this implementation, the system can indicate an arc or other path through which the user may move a smartphone or other video recording device.

However, the system can obtain an image of a user's ear in any other way.

8. DETECTING CONSTRAINING DIMENSIONS

Figure 2:
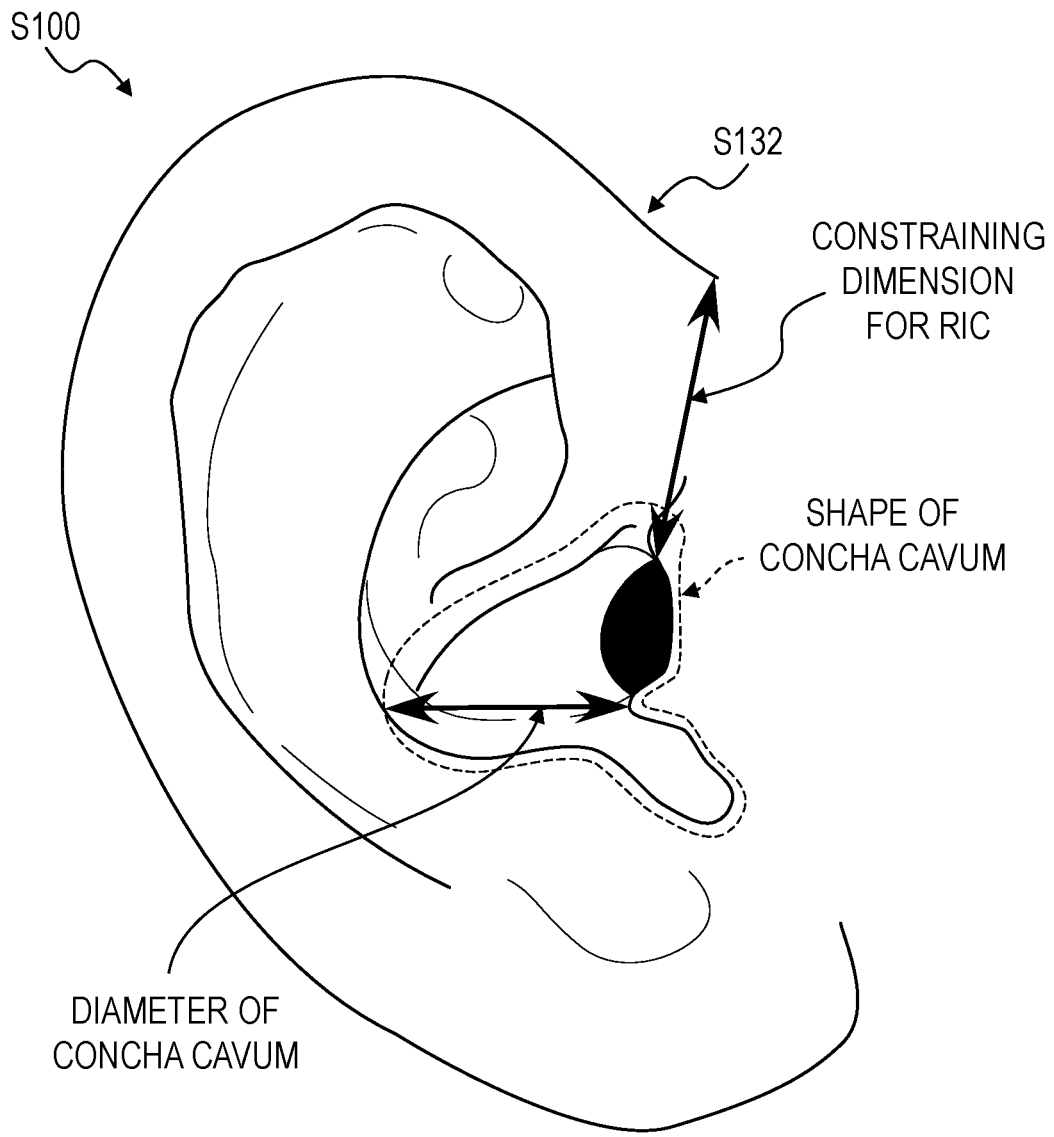
FIG. 2 is a flowchart representation of one variation of the method.
Figure 3:
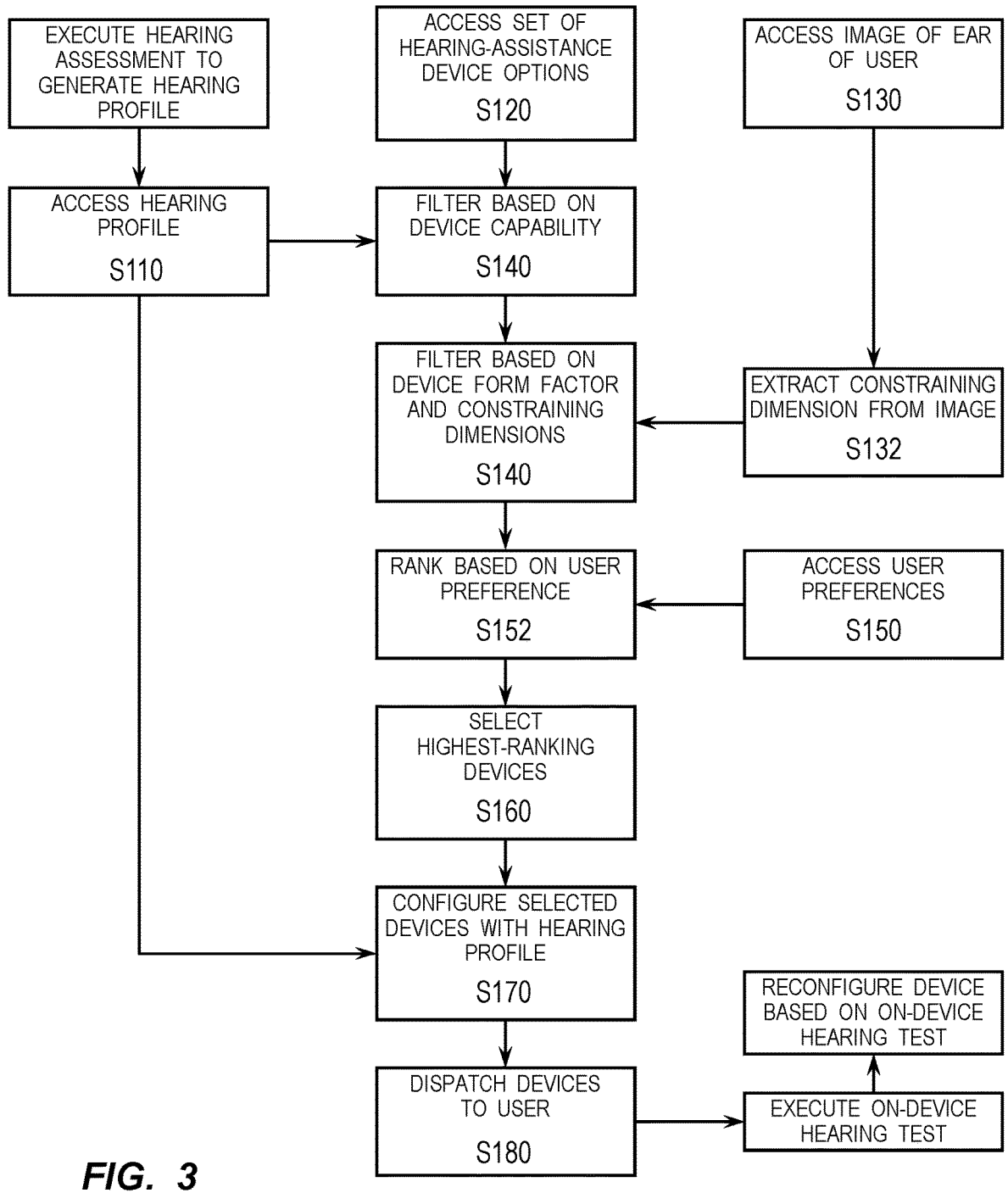
FIG. 3 is a flowchart representation of one variation of the method.

As shown in FIG. 2, in Block S132, the system can detect a constraining dimension for a form factor based on the image of the ear of the user. More specifically, the system can identify locations of physical features of the user's ear and measure the distance, angle, and or shape of the physical features based on the locations of the physical features in the recorded image of the user's ear in order to calculate a particular constraining dimension for the user's ear. The system can calculate multiple constraining dimensions in order to calculate sizes for a set of hearing-assistance devices characterized by multiple different form factors.

In order to detect accurate dimensions between the physical features of the user's ear, the system can scale the image based on a size reference in the image. More specifically, the system can: identify a size reference in the image; extract a set of pixel-domain dimensions from the image; and scale the set of pixel-domain dimensions according to the size reference to calculate the set of constraining dimensions. Thus, the system can extract more precise measurements on constraining dimensions from a single image of the user's ear.

In one implementation, the system can prompt the user to position the size reference at the same depth as the user's ear anatomy when recording the image and assume the depth of the size reference in the image relative to the camera is the same as the depth of the user's ear anatomy in the image relative to the camera. The system can then resize the entire image based on the apparent size of the size reference in the image.

Alternatively, the system can estimate a depth of the size reference relative to the ear anatomy of the user utilizing computer vision techniques. In this alternative implementation, the system can crop the image such that the cropped version of the image only contains the ear anatomy of the user and scale the cropped image based on the relative depth between the ear anatomy in the image and the size reference and the apparent size of the size reference in the image.

Additionally, the system can utilize concurrent sensor data such as from accelerometers and gyroscopes integrated with a user's mobile device (e.g., a smartphone or tablet computer) with the image recorded at the user's mobile device to automatically scale the image. Furthermore, the system can fuse multiple images (e.g., from a video recorded by a user's mobile device) with concurrent sensor data in order to estimate the scale of the user's ear anatomy and/or construct a three-dimensional model (e.g., a three-dimensional point cloud) representing the geometry of a user's ear anatomy in addition to the two-dimensional images of the user's ear anatomy. Thus, the system can: access a set of images of the ear of the user; generate a three-dimensional model of the ear of the user based on the set of images; and extract the set of constraining dimensions based on the three-dimensional model.

In one implementation, the system detects the location of the end of the user's forward helix and the highest point of the user's ear canal in order to measure the distance between these physical features, which can be a constraining dimension of RIC hearing aids. Thus, the system can detect a minimum distance between a forward helix of the ear of the user and an ear canal of the ear of the user in order to filter RIC hearing aids from the set of hearing-assistance device options.

In another implementation, the system detects physical features including the perimeter of a user's concha cavum. The system can then calculate the minimum diameter of the user's concha cavum as a constraining dimension for CIC hearing aids. In one implementation, the system can utilize an edge detection algorithm together with the computer vision model (further described below) to identify the perimeter of the user's concha cavum in the image. Subsequently, the system can identify a centroid of the user's concha cavum based on the identified perimeter and measure a diameter of the concha cavum corresponding to a size of a CIC hearing aid.

In one implementation, the system can identify various anatomical features along the edges of the concha cavum, such as the user's tragus, the user's antitragus, the user's antihelix, or the crus of the user's antihelix. The system can then calculate a diameter or chord of the user's concha cavum as a constraining dimension for a hearing-assistance device. Thus, the system can calculate a minimum diameter of a concha cavum of the ear of the user as a constraining dimension for ITE or CIC hearing aids.

In yet another implementation, the system can identify and record the shape of the perimeter of the user's concha cavum. The system can then utilize the shape of the user's concha cavum as a constraining dimension to identify hearing-assistance devices that fit the user's ear anatomy. Therefore, the system can compare the shape of a user's concha cavum to a cross section of a hearing-assistance device to evaluate the fit of the hearing-assistance device.

Additionally, the system can also identify other physical features and measure other constraining dimensions of a user's ear anatomy such as those pertaining to the concha cymba or the intertragal notch of the user, depending on the form factors of hearing-assistance devices in the catalogue of hearing-assistance devices.

However, the system can identify any physical feature of typical human ear anatomy and measure any constraining dimension that corresponds to a size of a hearing-assistance device characterized by a particular form factor.

8.1 Computer Vision Model

In one implementation, the system can execute a computer vision model in order to identify physical features of a user's ear anatomy. More specifically, the system can implement a convolutional neural network to: identify ear anatomy in the image of the user's ear anatomy; identify select physical features based on the form factors of hearing-assistance devices present in the catalogue of hearing-assistance devices; and measure constraining dimensions of the user's ear. The computer vision model can take in scaled and/or preprocessed images of a user's ear anatomy and identify the location of physical features of the user by identifying bounding boxes within the image, a particular pixel location, or a parameterized curve within the image.

In one implementation, the system can process images of ear anatomy that have been preprocessed by an edge detection algorithm yielding an edge detected greyscale image for further analysis by the computer vision model.

In another implementation, the system can process multiple images of a user's ear anatomy in order to increase the confidence with which the computer vision model can identify physical features and/or constraining dimensions of a user's ear anatomy. In one example, the system can prompt the user to record additional images of the user's ear anatomy until the system has achieved a threshold confidence level in identifying physical features of the user's ear anatomy.

The system can also train the computer vision model based on a database of labeled ear images, wherein the labeling can be performed by humans trained at identifying ear anatomy. For example, the system can enable a user interface for administrators to label a corpus of images of ear anatomy with bounding boxes, singular points, or curves including physical features of interest in the images of ear anatomy. The system can then provide the labeled images as a set of training examples for the computer vision model. The system can then execute standard training algorithms such that the computer vision model can accurately identify the physical features of interest within input images of user's ear anatomy.

9. EAR ANATOMY FILTERING OF HEARING-ASSISTANCE DEVICE OPTIONS

Generally, in Block S140, the system can filter the set of hearing-assistance device options associated with the form factor based on the constraining dimension. More specifically, the system can remove hearing-assistance device options that are characterized by sizes and/or form factors that do not correspond to values of constraining dimensions as measured by the system.

In one implementation, the system can include a predetermined sizing correspondence table that relates particular ranges of values for constraining dimensions to particular sizes and/or form factors of hearing-assistance devices. For example, the system can access a table indicating that if a distance between the end of a user's frontal helix and the closest point of the user's ear canal to the user's frontal helix is between 15 and 20 millimeters then the user should fit a size small RIC hearing aid of a particular model. In this example, the system can then remove from the set of hearing-assistance device options all RIC hearing aids of the particular model that are not a size small, thereby narrowing the number of devices that are eligible for selection for the user. For example, the system can, for each hearing-assistance device option in the set of hearing-assistance device options: identify a set of RIC hearing aid options in the set of hearing-assistance device options defining a form factor conforming to the minimum distance between the forward helix of the ear of the user and the ear canal of the ear of the user (according to the sizing correspondence table); identify a set of ITE hearing aid options in the set of hearing-assistance device options defining a form factor conforming to the minimum diameter of the concha cavum of the ear of the user (according to the sizing correspondence table); and generate the first subset of hearing-assistance device options comprising the set of receiver-in-canal hearing aid options and the set of in-the-ear hearing aid options. Thus, to determine which hearing-assistance device options correspond to the measured constraining dimensions, the system identifies the subset of hearing-assistance device options in the set of hearing-assistance device options that define sizes or form factors corresponding to ranges of the constraining dimension spanning the measured constraining dimension.

In another implementation, the system can execute a classification model based on the detected constraining dimensions. The classification model can be a neural network or other machine learning model that classifies a set of input constraining dimensions that describe a user's ear anatomy to calculate the best form factor or particular size of a hearing-assistance device for each form factor represented in the catalogue of hearing-assistance devices.

In yet another implementation, wherein the system detects the perimeter of the user's concha cavum as a constraining dimension, the system can execute a pattern matching algorithm to find a hearing-assistance device with a shape most complimentary to the detected shape of the user's concha cavum.

In implementations in which the system accesses a set of hearing-assistance device options that define a form factor that further indicates a set of tip sizes for the hearing-assistance device represented by the hearing-assistance device option, the system can also filter out tip sizes that do not correspond with the measured constraining dimensions of the user's ear.

However, the system can filter hearing-assistance device options representing hearing-assistance devices that are not likely to fit a set of constraining dimensions measured based on an image of the user's ear.

10. USER PREFERENCES

Generally, in Block S150, the system accesses a set of preferences of the user. More specifically, the system can: prompt the user to complete a survey indicating preferable characteristics for her hearing-assistance device; and/or access historical data of preferable characteristics for hearing-assistance device expressed by similar users. The system can prompt the user to answer survey questions to indicate a preferred color, a preferred form factor, a preferred price range, a preferred battery life, a preferred material, or any other preferred characteristic of a hearing-assistance device in order to better provide hearing-assistance device with user-preferred characteristics.

In one implementation, the system can prompt the user to complete a survey with information indicating the user's intended use case for the hearing-assistance device. For example, the user can indicate that she intends to use the hearing-assistance device in especially noisy environments (such as a large restaurant), to attenuate a loud sound in a construction site setting, in home environment, or any other environment. The system can then translate these preferences to specific selection criteria or ranking criteria. Alternatively, the system can incorporate the user's expressed preferences as a variable in a ranking model further described below.

In one implementation, the system can obtain additional user preference data from prior interactions with other users. For example, the system can track hearing-assistance device selections made by prior users of the system to identify correlations between basic demographic data (e.g., age, sex, occupation) for a user and expressed user preferences for particular characteristics of hearing-assistance devices. The system can therefore track final selections and rejections of hearing-assistance devices delivered to prior users. The system can then input these selections and rejections along with the demographic data associated with each corresponding prior user into the ranking model further described below.

In one implementation, the system can filter the set of hearing-assistance device options based on the price of each corresponding hearing-assistance device and the preferred price range of the user. Thus, each hearing-assistance device option can represent a specific feature configuration of a hearing-assistance device and an associated price of that configuration.

However, the system can obtain and incorporate user preferences for particular hearing-assistance device characteristics in any other way.

11. HEARING-ASSISTANCE DEVICE RANKING

Generally, in Block S152, the system can rank the filtered subset of hearing-assistance device options based on the set of preferences of the user. More specifically, the system can execute a ranking model to rank a set of remaining hearing-assistance device options. The system can execute the ranking model to generate a confidence score for each hearing-assistance device option that the system did not filter out of consideration based on the constraining dimensions of the user or the user's hearing profile. The ranking model takes in a vector of user preferences and outputs the confidence score representing the likelihood that the user selects the hearing-assistance device given the vector of user preference. Thus, the system can utilize any classification algorithm to execute the ranking model. Upon calculating a confidence score for each remaining hearing-assistance device option, the system can order the remaining hearing-assistance device options according to the confidence score, thereby ranking the hearing-assistance device options.

The system can train the ranking model based on selection and rejection data from prior users of the system. In one implementation, the system trains the ranking model based on a set of training examples, wherein each training example includes a preference vector of a prior user and at least one selection of a hearing-assistance device made by the same prior user. Additionally, the system can include negative training examples of hearing-assistance devices delivered to the user but returned by the user.

In one example, the system can access a set of user preferences that include an anticipated usage rate of the user (e.g., five hours per day). The system can then correlate this user preference with a particular attribute of a hearing-assistance device, such as the battery capacity of a hearing-assistance device. Thus, the system can rank the filtered subset of hearing-assistance device options based on the set of preference of the user and based on the battery capacity of the hearing-assistance device represented by each hearing-assistance device option in the filtered subset of hearing-assistance device options.

However, the system can rank the set of filtered (i.e. remaining) hearing-assistance device options according to any other model or metric associated with the likelihood of the user selecting a particular hearing-assistance device given the set of preferences expressed by the user. Alternatively, the system can rank the hearing-assistance device options, in part or entirely based on administrative preferences for particular hearing-assistance devices options in the set of filter hearing-assistance device options. For example, the system can weight the ranking of each hearing-assistance device option according to the preferences of an administrator, thereby increasing the rank of preferred hearing-assistance device options.

12. SELECTION AND DELIVERY

Generally, in Block S160, the system selects a subset of highest-ranked hearing-assistance device options from the filtered subset, the subset of highest-ranked hearing-assistance device options representing a set of hearing-assistance devices to be delivered to the user. More specifically, the system selects a number of hearing-assistance devices based on the ranking of filtered hearing-assistance device options and the previously obtained set of user preferences. In one implementation, the system selects hearing-assistance device options for delivery to the user according to selection criteria specified based on expressed preferences of the user and/or by an administrator of the system.

In one implementation, the system selects a subset of the filtered hearing-assistance device options corresponding to a predetermined number of the highest-ranked hearing device options. For example, the system can select the three highest-ranked hearing-assistance device options for delivery to the user.

In another implementation, the system establishes a set of selection criteria based on administrative or user preferences. For example, the system can execute a selection criterion established by an administrator that at least one of the selected hearing-assistance device options be an RIC hearing aid. In an alternative example, the system can prompt the user to respond to a survey question inquiring as to whether the user has a preferred form factor for her hearing-assistance device. If the user responds that she prefers CIC hearing aids, then the system can execute a selection criterion specifying that only CIC hearing aids be selected in Block S170. Assuming the system is executing a selection criterion, the system can select the highest-ranked hearing-assistance device option that satisfies the selection criterion.

In one example, the system can, in accordance with a selection criterion, select a set of highest-ranked hearing-assistance devices comprising: at least one RIC hearing aid, wherein the RIC hearing aid is the highest-ranked RIC hearing aid in the set of hearing-assistance device options; and at least one ITE hearing aid, wherein the ITE hearing aid is the highest-ranked ITE hearing aid in the set of hearing-assistance device options. Thus, when executing this selection criterion, the system ensures that at least one RIC hearing aid and at least one ITE hearing aid is delivered to the user, thereby guaranteeing the user an opportunity to experiment with both types of hearing aids.

Generally, the system can apply administrative selection criteria in order to increase variety in the selected subset of hearing-assistance devices delivered to the user thereby improving the likelihood that at least one of the hearing-assistance devices may be chosen by the user.

In one implementation, the system can resolve conflicts between selection criteria established by the administrator and selection criteria established by the user. For example, an administrator of the system may establish a selection criterion that the system select a set of hearing-assistance devices characterized by a variety of form factors for delivery to the user, while the user may specify selection criterion to select hearing-assistance devices of only a single form factor. In cases of conflict between selection criteria, the system can prioritize either a user's selection criteria or the administrator's selection criteria. Furthermore, the system can prioritize each selection criterion on a criterion-by-criterion basis. For example, an administrator of the system can specify that particular selection criterion not be compromised upon conflicts with user specified selection criterion.

Once the system selects a subset of the filtered and ranked hearing-assistance device options, the system can prompt delivery of (i.e. dispatch) the hearing-assistance devices corresponding to the selected hearing-assistance device options to the user.

In one implementation, the system can select a subset of hearing-assistance device options from a filtered set of hearing-assistance device options without first ranking these options according to user preference and based solely on a set of selection criteria. Additionally or alternatively, the system can select hearing-assistance device options based on any business-related or promotional concern.

13. HEARING PROFILE CONFIGURATION

Generally, in Block S180, the system configures each hearing-assistance device in the set of delivered hearing-assistance devices with the hearing profile of the user. More specifically, upon receipt of a hearing-assistance device (e.g., delivered hours, days, or weeks later), the user may pair the hearing-assistance device to her computing device, such as over a local ad hoc wireless network. The system—executing on the user's computing device—can then: link the hearing-assistance device (e.g., a unique identifier of the hearing-assistance device) to the user's profile; retrieve the refined hearing profile generated during the initial assessment described above; and upload the refined hearing profile to the hearing-assistance device.

The hearing-assistance device can then immediately begin: detecting audio signals in; processing these audio signals according to the refined hearing profile; and outputting these processed audio signals—now with select frequency bands amplified according to the refined hearing profile—via a speaker integrated into the hearing-assistance device. The hearing-assistance device can therefore implement the refined hearing profile generated during the hearing assessment, which was performed on the user's computing device with another audio output device (e.g., a separate set of headphones).

However, because the hearing-assistance device may (or is likely) to exhibit a frequency response that differs from the frequency response of the user's computing device and headphones, the refined hearing profile generated during the hearing assessment may fully compensate for the user's hearing loss when implemented by the hearing-assistance device. Nonetheless, the refined hearing profile generated during the hearing assessment may better represent the user's hearing augmentation needs than a nominal hearing profile when implemented by the hearing-assistance device. Therefore, the hearing-assistance device can initially implement the refined hearing profile; and the system can cooperate with the hearing-assistance device to execute an on-device hearing assessment and to modify the refined hearing profile accordingly.

13.1 On-Device Hearing Assessment

In one variation, described in U.S. Pat. No. 10,595,135, which is incorporated by reference in its entirety, after uploading the user's hearing profile—generated during the initial assessment as described above—to the hearing-assistance device and once the user initiates an on-device hearing assessment, the system can execute a process for revising the user's hearing profile similar to the hearing assessment process described above. However, instead of selectively amplifying each soundbite based on test hearing profiles, the system can: upload the test hearing profiles to the hearing-assistance device; confirm that the hearing-assistance device has activated the hearing profile (e.g., the digital signal processor of the hearing device is executing a set of digital filters in order to amplify input sound according to the uploaded hearing profile); and play the raw soundbite (e.g., without amplification) such that the only amplification applied to the soundbite is performed at the hearing-assistance device. Thus, the system can assess user preferences for the refined hearing profile given the particular frequency response characteristics of the hearing-assistance device.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
    generating a hearing profile for a user based on a hearing assessment of the user;
    accessing a set of hearing-assistance device options, each hearing-assistance device option defining a form factor of a hearing-assistance device, in a set of hearing-assistance devices;
    accessing an image of an ear of the user;
    detecting the ear in a region of the image;
    extracting a set of features from the region of the image;
    interpreting a set of constraining dimensions of the ear of the user based on the set of features;
    identifying a subset of hearing-assistance device options, in the set of hearing-assistance device options, defining form factors conforming to the set of constraining dimensions;
    selecting a first hearing-assistance device option from the subset of hearing-assistance devices; and
    configuring a first hearing-assistance device represented by the first hearing-assistance device option with the hearing profile for the user.

2. The method of claim 1, wherein selecting a first hearing-assistance device option from the subset of hearing-assistance devices comprises:
    accessing a set of preferences of the user;
    ranking the subset of hearing-assistance device options based on the set of preferences of the user;
    selecting a first hearing-assistance device option, from the subset of hearing-assistance device options, corresponding to a highest rank in the subset of hearing-assistance device options.

3. The method of claim 1:
    wherein interpreting the set of constraining dimensions based on the image of the ear of the user comprises:
        identifying a size reference in the image;
        extracting a set of pixel-domain dimensions from the image;
        scaling the set of pixel-domain dimensions according to the size reference to calculate the set of constraining dimensions; and
    further comprising extracting the set of constraining dimensions from the image of the ear of the user, the constraining dimensions comprising:
        a minimum distance between a forward helix of the ear of the user and an ear canal of the ear of the user; and
        a minimum diameter of a concha cavum of the ear of the user.

4. The method of claim 3, wherein identifying the subset of hearing-assistance device options comprises:
    identifying a set of receiver-in-canal hearing aid options in the set of hearing-assistance device options, each receiver-in-canal hearing aid option in the set of receiver-in-canal hearing aid options defining a form factor conforming to the minimum distance between the forward helix of the ear of the user and the ear canal of the ear of the user;
identifying a set of in-the-ear hearing aid options in the set of hearing-assistance device options, each in-the-ear hearing aid option in the set of in-the-ear hearing aid options defining a form factor conforming to the minimum diameter of the concha cavum of the ear of the user; and
generating the subset of hearing-assistance device options comprising the set of receiver-in-canal hearing aid options and the set of in-the-ear hearing aid options.

5. The method of claim 1:
wherein selecting the first hearing-assistance device option from the subset of hearing-assistance device options comprises selecting a set of highest-ranked hearing-assistance device options from the subset of hearing-assistance device options for delivery to the user, the set of highest-ranked hearing-assistance device options representing a set of highest-ranked hearing-assistance devices comprising:
a highest-ranked receiver-in-canal hearing aid; and
a highest-ranked in-the-ear hearing aid; and
wherein configuring the first hearing-assistance device represented by the first hearing-assistance device option with the hearing profile for the user comprises configuring the set of highest-ranked hearing-assistance devices with the hearing profile for the user.

6. The method of claim 1:
wherein generating the hearing profile comprises generating the hearing profile for the user based on the hearing assessment, the hearing profile specifying a minimum full-on-gain and a minimum number of frequency channels of a hearing-assistance device capable of executing the hearing profile;
wherein accessing the set of hearing-assistance device options comprises accessing the set of hearing-assistance device options, each hearing-assistance device option:
defining a full-on gain of the hearing-assistance device;
defining a number of frequency channels of the hearing-assistance device; and
defining the form factor of the hearing-assistance device; and
wherein identifying the subset of hearing-assistance device options comprises identifying the subset of hearing-assistance device options, in the set of hearing-assistance device options:
defining form factors conforming to the set of constraining dimensions;
defining full-on gains greater than the minimum full-on gain; and
defining numbers of frequency channels greater than the minimum number of frequency channels.

7. The method of claim 1, wherein generating the hearing profile for the user comprises:
generating a baseline hearing profile for the user based on demographic data of the user;
receiving a set of hearing preferences of the user expressed in response to listening to a series of soundbites comprising recognizable sounds amplified by variations of the baseline hearing profile; and
modifying the baseline hearing profile based on the set of hearing preferences to generate the hearing profile for the user.

8. The method of claim 7, wherein receiving the set of hearing preferences of the user comprises:
rendering a first slider bar in a user interface representing a first parameter of a first soundbite of the series of soundbites, the first parameter representing full-on gain;
adjusting the first parameter based on a first change in a position of the first slider bar.

9. The method of claim 8, further comprising:
in response to receiving confirmation of the user's input, rendering a second slider bar in the user interface representing a second parameter of the first soundbite of the series of soundbites, the second parameter corresponding to a number of frequency channels;
adjusting the second parameter based on a first change in a position of the second slider bar.

10. The method of claim 9, wherein rendering the second slider bar comprises rendering the second slider bar in response to receiving confirmation of the user's input exceeding a threshold value, rendering a second slider bar representing a second parameter.

11. The method of claim 9, wherein rendering the second slider bar comprises rendering the second slider bar in response to receiving confirmation of the user's input falling below a threshold value, rendering a second slider bar representing a third parameter.

12. The method of claim 9:
further comprising ranking the first parameter and second parameter by a predicted magnitude of perceived change during the hearing assessment; and
wherein rendering a first slider bar in the user interface comprises rendering a first slider bar representing a first ranked parameter.

13. The method of claim 9,
further comprising ranking the first parameter and second parameter by sensitivity based on a sensitivity analysis of the user; and
wherein rendering a first slider bar in the user interface comprises rendering a first slider bar representing a first ranked parameter.

14. The method of claim 1, further comprising:
generating a hearing profile for the user based on a hearing assessment of the user executed at a mobile device;
configuring the first hearing-assistance device represented by the first hearing-assistance device option with the hearing profile for the user;
at a mobile device, in response to wireless communication between the mobile device and the first hearing-assistance device:
rendering a slider, associated with a parameter of the hearing profile, within a user interface;
outputting a tone; and
in response to a change in position of the slider within the user interface:
generating an updated hearing profile based on the hearing profile and the change in position of the slider; and
uploading the updated hearing profile to the first hearing-assistance device.

15. A method comprising:
detecting a constraining dimension based on an image of an ear of the user;
accessing a set of hearing-assistance device options, each hearing-assistance device option in the set of hearing-assistance device options defining a form factor of the hearing-assistance device, the form factor conforming to a range of the constraining dimension;

accessing a set of preferences of the user;

identifying a first subset of hearing-assistance device options in the set hearing-assistance device options:

defining form factors conforming to the constraining dimension; and most likely to be selected by the user based on the set of preferences of the user; and dispatching a selected set of hearing-assistance devices to the user.

16. The method of claim 15:

further comprising:

generating a hearing profile for the user based on a hearing assessment specifying a minimum full-on-gain and a minimum number of frequency channels of a hearing-assistance device capable of executing the hearing profile; and configuring the selected set of hearing-assistance devices with the hearing profile for the user, the selected set of hearing-assistance devices represented by the first subset of hearing-assistance device options; and wherein accessing the set of hearing-assistance device options comprises accessing the set of hearing-assistance device options, each hearing-assistance device option:

defining a full-on gain of the hearing-assistance device;

defining a number of frequency channels of the hearing-assistance device; and defining the form factor of the hearing-assistance device; and wherein identifying the first subset of hearing-assistance device options comprises identifying the first subset of hearing-assistance device options, in the set of hearing-assistance device options:

defining form factors conforming to the set of constraining dimensions;

defining full-on gains greater than the minimum full-on gain; and defining numbers of frequency channels greater than the minimum number of frequency channels.

17. A method comprising:

accessing a set of hearing-assistance device options, each hearing-assistance device option:

defining a set of tip sizes available for the hearing-assistance device, in a set of hearing-assistance devices; and defining a form factor of a hearing-assistance device, in the set of hearing-assistance devices;

accessing an image of an ear of the user;

detecting the ear in a region of the image;

extracting a set of features from the region of the image;

interpreting a set of constraining dimensions of the ear of the user based on the set of features comprising interpreting a shape of a concha cavum of the ear of the user;

identifying a subset of hearing-assistance device options, in the set of hearing-assistance device options, defining form factors conforming to the set of constraining dimensions; and for each hearing-assistance device option in the subset of hearing-assistance device options, identifying a tip size of the hearing assistance device in the set of tip sizes available for the hearing-assistance device conforming to the shape of the concha cavum of the ear of the user;

selecting a first hearing-assistance device option from the subset of hearing-assistance devices.

18. A method comprising:

accessing a set of hearing-assistance device options, each hearing-assistance device option defining a form factor of a hearing-assistance device, in a set of hearing-assistance devices;

accessing a set of images of an ear of the user;

detecting the ear in a region of the image;

generating a three-dimensional model of the ear of the user based on the set of images;

extracting the set of constraining dimensions from the three-dimensional model;

identifying a subset of hearing-assistance device options, in the set of hearing-assistance device options, defining form factors conforming to the set of constraining dimensions; and selecting a first hearing-assistance device option from the subset of hearing-assistance devices.

* * * * *